US009710419B2

(12) United States Patent
Hug et al.

(10) Patent No.: US 9,710,419 B2
(45) Date of Patent: Jul. 18, 2017

(54) SYSTEM AND METHOD FOR MASTER-SLAVE DATA TRANSMISSION BASED ON A FLEXIBLE SERIAL BUS FOR USE IN HEARING DEVICES

(75) Inventors: Roland Hug, Hinwil (CH); Rolf Laich, Ruti (CH); Alexander Maksyagin, Benglen (CH); David Perels, Zurich (CH)

(73) Assignee: SONOVA AG, Staefa (CH)

( * ) Notice: Subject to any disclaimer, the term of this patent is extended or adjusted under 35 U.S.C. 154(b) by 305 days.

(21) Appl. No.: 14/404,232

(22) PCT Filed: May 31, 2012

(86) PCT No.: PCT/EP2012/060272
§ 371 (c)(1),
(2), (4) Date: Nov. 26, 2014

(87) PCT Pub. No.: WO2013/178274
PCT Pub. Date: Dec. 5, 2013

(65) Prior Publication Data
US 2015/0339257 A1    Nov. 26, 2015

(51) Int. Cl.
*G06F 13/36* (2006.01)
*G06F 13/42* (2006.01)
(Continued)

(52) U.S. Cl.
CPC .......... *G06F 13/4282* (2013.01); *G06F 1/12* (2013.01); *H04L 5/16* (2013.01); *H04L 7/04* (2013.01);
(Continued)

(58) Field of Classification Search
None
See application file for complete search history.

(56) References Cited

U.S. PATENT DOCUMENTS 7,292,876 B2    11/2007    Bosch
2004/0116151 A1*    6/2004    Bosch ............... G06F 13/4291
455/550.1
(Continued)

FOREIGN PATENT DOCUMENTS

WO    2004/110099 A2    12/2004
WO    2010/115451 A1    10/2010

OTHER PUBLICATIONS

International Search Report for PCT/EP2012/060272 dated Feb. 11, 2013.
Written Opinion for PCT/EP2012/060272 dated Feb. 11, 2013.

*Primary Examiner* — Henry Tsai
*Assistant Examiner* — Aurangzeb Hassan
(74) *Attorney, Agent, or Firm* — Pearne & Gordon LLP (57) ABSTRACT

A data transmission system for use in hearing devices includes a master unit with a first local bit clock and a slave unit with a second local bit clock. The master unit and the slave unit are connected to each other via a bus line, and are configured to communicate over the bus line according to a communication protocol based on a frame-wise serial transmission of bits. Each frame includes a clock reference, a master signalling interval, a slave signalling interval and a data payload. The slave unit further includes a clock recovery device for synchronizing the second local bit clock with the first local bit clock based on the clock reference transmitted once per frame by the master unit. A corresponding method for data transmission is also provided. Moreover, hearing devices including such a data transmission system as well as uses of such a method for data transmission are proposed.

34 Claims, 4 Drawing Sheets

(51) Int. Cl.
  *G06F 1/12*   (2006.01)
  *H04L 5/16*   (2006.01)
  *H04L 7/04*   (2006.01)
  *H04R 25/00*  (2006.01)
  *H04L 12/403* (2006.01)
  *G06F 13/40*  (2006.01)
  *G06F 13/28*  (2006.01)

(52) U.S. Cl.
  CPC ........... *H04L 12/403* (2013.01); *H04R 25/55* (2013.01); *G06F 13/28* (2013.01); *G06F 13/4022* (2013.01); *G06F 13/4027* (2013.01); *H04L 7/046* (2013.01)

(56)         References Cited

U.S. PATENT DOCUMENTS

2007/0009124 A1*  1/2007  Larsen ................ H04R 25/554
                                                    381/315
2009/0003629 A1*  1/2009  Shajaan .............. H04R 1/005
                                                    381/113
2012/0263218 A1* 10/2012  Dal Molin .......... A61N 1/37288
                                                    375/224
2013/0058495 A1*  3/2013  Furst ..................... H04R 3/00
                                                     381/80
2014/0233527 A1*  8/2014  Gehring ............. H04R 25/554
                                                    370/330

* cited by examiner

| Master unit send request and master unit receive (RX) state | Slave unit send request and slave unit receive (RX) state | Bus arbitration decision for the data payload | Master signalling | | | Slave signalling | | |
|---|---|---|---|---|---|---|---|---|
| | | | Master signalling bit 1 | Master signalling bit 2 | Master signalling bit 3 | "Slave live" bit (1) | Slave signalling bit 2 | Slave signalling bit 3 |
| Any (but slave not alive) | Slave not alive | Master initiates re-synchronisation | - | - | - | 0 | - | - |
| Master send data and master RX ready | Slave send data and slave RX ready | Master sends data | 1 | 0 | 1 | 1 | 1 | 1 |
| Master send data and master RX ready | Slave send data and slave RX not ready | Slave sends data | 1 | 0 | 1 | 1 | 1 | 0 |
| Master send data and master RX ready | Slave send interrupt | Slave sends interrupt | 1 | 0 | 1 | 1 | 0 | 0 |
| Master send data and master RX ready | Slave no send intention and slave RX not ready | Master sends idle | 1 | 0 | 1 | 1 | 0 | 1 |
| Master send data and master RX ready | Slave no send intention and slave RX ready | Master sends data | 1 | 0 | 1 | 1 | 1 | 1 |
| Master send data and master RX not ready | Slave send data and slave RX ready | Master sends data | 1 | 0 | 0 | 1 | 1 | 1 |
| Master send data and master RX not ready | Slave send data and slave RX not ready | Master sends idle | 1 | 0 | 0 | 1 | 1 | 0 |
| Master send data and master RX not ready | Slave send interrupt and slave RX don't care | Slave sends interrupt | 1 | 0 | 0 | 1 | 0 | 0 |
| Master send data and master RX not ready | Slave no send intention and slave RX not ready | Master sends idle | 1 | 0 | 0 | 1 | 0 | 1 |
| Master send data and master RX not ready | Slave no send intention and slave RX ready | Master sends data | 1 | 0 | 0 | 1 | 1 | 1 |
| Master send interrupt and master RX don't care | Slave send data and slave RX don't care | Master send interrupt | 0 | 0 | 0 | 1 | 1 | 1 |
| Master send interrupt and master RX don't care | Slave send interrupt and slave RX don't care | Master send interrupt | 0 | 0 | 0 | 1 | 1 | 1 |
| Master send interrupt and master RX don't care | Slave no send intention and slave RX don't care | Master send interrupt | 0 | 0 | 0 | 1 | 1 | 1 |
| Master no send intention and master RX not ready | Slave send data and slave RX don't care | Master sends idle | 1 | 1 | 0 | 1 | 1 | 1 |

| Master | Slave | Action | | | | | | |
|---|---|---|---|---|---|---|---|---|
| Master no send intention and master RX not ready | Slave send interrupt and slave RX don't care | Slave sends interrupt | 1 | 1 | 0 | 1 | 0 | 0 |
| Master no send intention and master RX not ready | Slave no send intention and slave RX don't care | Master sends idle | 1 | 1 | 0 | 1 | - | 1 |
| Master no send intention and master RX ready | Slave send data and slave RX don't care | Slave sends data | 1 | 1 | 1 | 1 | - | 0 |
| Master no send intention and master RX ready | Slave send interrupt and slave RX don't care | Slave sends interrupt | 1 | 1 | 1 | 1 | 0 | 0 |
| Master no send intention and master RX ready | Slave no send intention and slave RX don't care | Master sends idle | 1 | 1 | 1 | 1 | - | 1 |
| Reserved (e.g. for multi-frame signalling) | | | 0 0 0 | 0 1 1 | 1 0 1 | | | |

- = don't care

Fig. 3 (continued)

SYSTEM AND METHOD FOR MASTER-SLAVE DATA TRANSMISSION BASED ON A FLEXIBLE SERIAL BUS FOR USE IN HEARING DEVICES

TECHNICAL FIELD

The present invention relates to serial data transmission between a master unit and a slave unit, and especially to a system and method for such data transmission suitable for use in hearing devices.

BACKGROUND OF THE INVENTION

Electronic devices such as small hearing devices worn at or in the ear are becoming increasingly sophisticated. Typically such devices include a plurality of integrated circuits which need to exchange different types of data, for instance event-based control information as well as real-time data streams conveying audio signals. Commonly every data type is communicated via a dedicated bus, thus requiring multiple wires between the components. The number of wires interconnecting the components is especially critical for small devices such as hearing devices which need to fit behind an ear or even into an ear canal. State of the art hearing devices for instance commonly employ the following types of standard serial buses:
- I²C (Inter-Integrated Circuit) for control data, requiring two wires for data and clock;
- SPI (Serial Peripheral Interface) also for control data, requiring three wires for data, clock and one chip select wire for each slave unit connected to the bus;
- I²S (Inter-IC Sound) for digital audio data, requiring at least three wires for transmission of up to two audio data channels in one direction and at least four wires for bi-directional transmission; and
- S/PDIF (Sony/Philips Digital Interconnect Format) also for digital audio data, based on one wire used for the transmission of up to two audio channels in one direction, so that two wires are needed to provide bi-directional transmission.

Besides size constrains small portable electronic devices such as hearing devices are typically battery-operated. This imposes stringent power efficiency requirements also on the communication infrastructure within the devices. The standard buses listed above, especially for audio transmission, are not optimised in this respect.

SUMMARY OF THE INVENTION

It is an object of the present invention to provide a system and method for data transmission that are especially suitable for use in hearing devices, i.e. that specifically take into account the very stringent limitations on the amount of available space and power.

Within the context of the present invention the term "hearing device" refers to hearing aids (alternatively called hearing instruments or hearing prostheses) used to compensate hearing impairments of hard of hearing persons as well as audio and communication devices used to provide sound signals to persons with normal hearing capability, e.g. in order to improve hearing in harsh acoustic surroundings. Moreover, it also encompasses ear-level hearing protection devices, which safeguard a user from damaging his sense of hearing when subjected to severe acoustic shock events such as for instance gunfire or when exposed to excessive noise or sound levels for prolonged periods of time. Combinations of the mentioned devices such as for example hearing protection devices including a communication capability are also regarded as hearing devices in connection with the present invention.

The object stated above is achieved by the data transmission system according to claim 1 for use in hearing devices. Furthermore, this object is achieved by the corresponding method for data transmission according to claim 19. Moreover, hearing devices comprising such a data transmission system according to the present invention are proposed in claims 17 and 18, and uses of the method for data transmission according to the present invention are proposed in claims 35 and 36. Preferred embodiments are given in the dependent claims.

The present invention provides a data transmission system for use in hearing devices, comprising a master unit with a first local bit clock and a slave unit with a second local bit clock, the master unit and the slave unit being connected to each other via a bus line, and being configured to communicate over the bus line according to a communication protocol based on a frame-wise serial transmission of bits, each frame comprising a clock reference, a master signalling interval, a slave signalling interval and a data payload, wherein the slave unit further comprises clock recovery means for synchronising the second local bit clock with the first local bit clock based on the clock reference transmitted once per frame by the master unit. The proposed solution thus minimises the number of interconnections between components to a single line or wire, thus meeting the requirement of minimal usage of space. The clock signal is not distributed on a dedicated line, but merely a clock reference signal is transmitted from the master unit to the slave unit once per frame. The slave then corrects any offsets in phase and frequency between its local bit clock and the local bit clock of the master unit based on the clock reference it receives from the master unit.

In an embodiment of the data transmission system the data payload comprises at least one of the following:
control data;
audio data;
metadata.

The proposed solution is thus flexible in that the transmission system can support different types of data such as event-based control data as well as real-time audio data and metadata, where metadata for instance provides information about the content of audio data, e.g. the type of audio data such as for instance music or speech.

In a further embodiment of the data transmission system the master unit and the slave unit are further connected to each other via one or more further bus lines, and are configured to transfer further data payloads comprising audio data and/or metadata over the one or more further bus lines using frame-wise serial transmission of bits. The proposed solution is thus scalable in that the transmission system can support various amounts of data traffic by adding further bus lines, i.e. the real-time data throughput and transmission capacity can be adapted to the requirements of diverse applications.

In a further embodiment of the data transmission system the transfer of the further data payloads over the one or more further bus lines is configurable to be either from the master unit to the slave unit or from the slave unit to the master unit or in both directions within a frame dependent on information contained in the data payload transferred over the bus line. The proposed solution is thus flexible in that the transmission system supports configurability of the direction of transmission and enables bi-directional, half-duplex exchange of data.

In a further embodiment of the data transmission system the master unit further comprises drive means for driving the bus line such that edges of the clock reference are steeper than edges of bit transitions within the master signalling interval, the slave signalling interval and the data payload. The proposed solution thus ensures accurate clock synchronisation whilst saving power by limiting higher power driving of the bus line to a minimum to those instances where sharp signal edges are important. The latter also has the advantage of producing less electro-magnetic interference (EMI), which could otherwise for instance compromise the quality of the sound generated by the loudspeaker of the hearing device, because many sharp signal edges give rise to greater EMI, which then likely causes disturbances in the surrounding electronic components.

In a further embodiment of the data transmission system master signalling bits are transmitted from the master unit to the slave unit during the master signalling interval, the master signalling bits comprising information pertaining to at least one of the following in respect of the frame within which the master signalling bits are transmitted:
  a request of the master unit to send a data payload to the slave unit;
  an indication that the master unit will not send a data payload to the slave unit;
  an indication that the master unit is ready to receive a data payload from the slave unit;
  an indication that the master unit is not ready to receive a data payload from the slave unit;
  an indication that the master unit will send interrupt vector data to the slave unit.

In a further embodiment of the data transmission system slave signalling bits are transmitted from the slave unit to the master unit during the slave signalling interval, the slave signalling bits comprising information pertaining to at least one of the following in respect of the frame within which the slave signalling bits are transmitted:
  an indication that the slave unit is synchronised to the frame;
  an indication that the slave unit does not intend to send a data payload to the master unit;
  an indication that the slave unit will send a data payload to the master unit;
  an indication that the slave unit is ready to receive a data payload from the master unit;
  an indication that the slave unit is not ready to receive a data payload from master unit;
  an indication that the slave unit will send interrupt vector data to the master unit.

In a further embodiment of the data transmission system the slave signalling bits are dependent on the master signalling bits transmitted within only the same frame. This implies that the slave unit only evaluates the most current master signalling bits and is not required to keep a history of previously received master signalling bits, i.e. to store them in memory. As a result less memory is required and a less complex state machine needs to be implemented, hence yielding a smaller circuit and reduced power consumption.

The proposed solutions thus enable event communication with predicable real-time properties, i.e. interrupts can be communicated within a frame interval, without requiring separate dedicated interrupt lines. Moreover, a flow control mechanism is provided to support units with limited memory for communication buffers and/or a processing unit having a slow response time, e.g. in order to reduce power consumption by clocking the processing unit at a low speed.

In a further embodiment of the data transmission system the slave unit exclusively makes any decisions regarding bus arbitration based on the master signalling bits it has received from the master unit and based on its own intent to utilise the bus line, and subsequently sends these decisions regarding bus arbitration to the master unit via the slave signalling bits. The master unit then merely takes action according to the decision regarding bus arbitration of the slave unit as transmitted via the slave signalling bits.

In a further embodiment of the data transmission system a first slave signalling bit provides an indication that the slave unit is synchronised to the frame.

In a further embodiment of the data transmission system the slave unit is configured to send the first slave signalling bit immediately following reception of the clock reference.

The proposed solutions thus enable rapid detection by the master unit that the slave unit has achieved frame synchronisation.

In a further embodiment of the data transmission system the master unit further comprises a bus keeper (also referred to as a bus holder, i.e. a weak latch circuit which holds the most recent value on a tri-state bus) and is configured to activate the bus keeper at least immediately following transmission of the clock reference, preferably for no longer than a bit interval. The proposed solution thus ensures a reliable detection of the first slave signalling bit, which is important because it indicates if the slave unit is synchronised to the frame, which determines whether a data exchange can be started, i.e. data payloads can be transmitted.

In a further embodiment of the data transmission system at least part of the data payload is dynamically assignable dependent on the information exchanged between the master unit and the slave unit in the master signalling interval and the slave signalling interval and according to the following priority scheme:
  interrupt vector data from the master unit to the slave unit with highest priority;
  interrupt vector data from the slave unit to the master unit with second highest priority;
  control data and/or audio data and/or metadata from the master unit to the slave unit with third highest priority;
  control data and/or audio data and/or metadata from the slave unit to the master unit with fourth highest priority.

The proposed solution thus provides a mechanism for prioritising what sort of data is to be sent and by which of the master unit or the slave unit this data will be sent. This especially allows rapid (i.e. low latency), deterministic and efficient interrupt vector signalling.

In a further embodiment of the data transmission system the master unit and the slave unit each further comprise a protocol state machine, the protocol state machine being capable of supporting the following protocol states:
  "initialise"/"sleep" state, wherein neither the master unit nor the slave unit drive the bus line and the bus line is maintained in a pull-down state;
  "unsynchronised" state, wherein the master unit sends frames consisting of a continuous stream of identical bits and a clock reference comprising at least one bit transition;
  "frame synchronised" state, wherein the slave unit transmits signalling bits to the master unit during the slave signalling interval indicating to the master unit that the slave unit is synchronised to the frame, e.g. by means of a "slave alive" signalling bit.

The proposed solution thus provides a very simple protocol state machine which leads to a low implementation complexity and thus results in a small circuit size and low power consumption.

In a further embodiment of the data transmission system the slave unit is configured to wake up the master unit from the "sleep" state by sending a wake-up pulse pattern of configurable duration, such as a continuous stream of "1"s, for instance lasting longer than a wake-up detection period of the master unit.

The proposed solutions further provide a sleep mode where no data is exchanged on the bus line(s) and both the master unit and the slave unit are almost inactive apart from circuitry for detecting a wake-up signal, which too can be inactive most of the time and only intermittently becomes active to check if a wake-up signal is present.

In a further embodiment the data transmission system further comprises a first reset unit, which is inserted between the master unit and the bus line, and a second reset unit, which is inserted between the slave unit and the bus line, wherein the first reset unit is configured to send a reset signal, such as a continuous stream of "1"s for a duration of at least a frame interval (without inserting a clock reference), and the second reset unit is configured to reset the slave unit upon detecting the reset signal sent by the first reset unit. The proposed solution thus provides a reset mechanism which is independent of the transmission protocol, because the first reset unit can monitor the output of the master unit and can override the signal applied by the master unit to the bus line. The proposed solution thus does not require any additional reset lines and hence saves space. Conversely, the second reset unit is (further) configured to send a reset signal, and the first reset unit is (further) configured to reset the master unit upon detecting a reset signal sent by the second reset unit.

In a further embodiment of the data transmission system the data are scrambled in order to whiten transmitted binary data sequences. The proposed solution thus provides a means by which interference caused by long repetitive bit sequences is avoided, thus for instance ensuring that no disturbing sounds are generated by the loudspeaker of the hearing device.

The present invention further provides a hearing device comprising the proposed embodiments of the data transmission system, wherein the frequency of the first local bit clock and/or the frequency of the second local bit clock is related to a sampling frequency of an audio signal from which audio data is derived.

The present invention further provides another hearing device comprising the proposed embodiments of the data transmission system, wherein the master unit is part of an integrated circuit of the hearing device and the slave unit is part of a further integrated circuit of the hearing device or part of an accessory physically attached to the hearing device, such as a plug-on device, in particular of a "digital audio shoe". A "digital audio shoe" being a version of an accessory known as an audio or FM (frequency modulation; wireless receiver) "shoe" that can be attached to many hearing devices for providing a direct audio input to the hearing device in the form of a digital audio signal, instead of an analogue audio signal as is usually the case with a standard (i.e. analogue) audio or FM shoe.

The present invention further provides a corresponding method for data transmission between a master unit with a first local bit clock and a slave unit with a second local bit clock via a bus line connecting the master unit and the slave unit to each other, wherein bits are serially transmitted using a frame structure, the method comprising the steps of:
  transmitting master signalling bits from the master unit to the slave unit during a master signalling interval in each frame;
  transmitting a clock reference from the master unit to the slave unit once per frame;
  synchronising the second local bit clock with the first local bit clock based on the clock reference;
  transmitting slave signalling bits from the slave unit to the master unit during a slave signalling interval in each frame;
  transmitting a data payload either from the master unit to the slave unit or from the slave unit to the master unit in each frame.

In an embodiment of the method the data payload comprises at least one of the following:
  control data;
  audio data;
  metadata.

In a further embodiment of the method the master unit and the slave unit are further connected to each other via one or more further bus lines, the method further comprising the step of serially transmitting bits of data payloads with audio data and/or metadata over the one or more further bus lines using frame-wise serial transmission of bits.

In a further embodiment of the method the transfer of the further data payloads over the one or more further bus lines is configured to be either from the master unit to the slave unit or from the slave unit to the master unit or in both directions within a frame dependent on information from the data payload transferred over the bus line.

In a further embodiment of the method the master unit drives the bus line such that edges of the clock reference are steeper than edges of bit transitions within the master signalling interval, the slave signalling interval and the data payload.

In a further embodiment the method further comprises the step of transmitting master signalling bits from the master unit to the slave unit during the master signalling interval, the master signalling bits comprising information pertaining to at least one of the following in respect of the frame within which the master signalling bits are transmitted:
  a request of the master unit to send a data payload to the slave unit;
  an indication that the master unit will not send a data payload to the slave unit;
  an indication that the master unit is ready to receive a data payload from the slave unit;
  an indication that the master unit is not ready to receive a data payload from the slave unit;
  an indication that the master unit will send interrupt vector data to the slave unit.

In a further embodiment the method further comprises the step of transmitting slave signalling bits from the slave unit to the master unit during the slave signalling interval, the slave signalling bits comprising information pertaining to at least one of the following in respect of the frame within which the slave signalling bits are transmitted:
  an indication that the slave unit is synchronised to the frame;
  an indication that the slave unit does not intend to send a data payload to the master unit;
  an indication that the slave unit will send a data payload to the master unit;
  an indication that the slave unit is ready to receive a data payload from the master unit;

an indication that the slave unit is not ready to receive a data payload from master unit;

an indication that the slave unit will send interrupt vector data to the master unit.

In a further embodiment of the method the slave signalling bits are dependent on the master signalling bits transmitted within only the same frame.

In a further embodiment of the method a first slave signalling bit provides an indication that the slave unit is synchronised to the frame.

In a further embodiment of the method the slave unit sends the first slave signalling bit immediately following reception of the clock reference.

In a further embodiment of the method the master unit activates a bus keeper at least immediately following transmission of the clock reference, preferably for no longer than a bit interval.

In a further embodiment the method further comprises the step of dynamically assigning at least part of the data payload dependent on the information exchanged between the master unit and the slave unit during the master signalling interval and the slave signalling interval and according to the following priority scheme:

interrupt vector data from the master unit to the slave unit with highest priority;

interrupt vector data from the slave unit to the master unit with second highest priority;

control data and/or audio data and/or metadata from the master unit to the slave unit with third highest priority;

control data and/or audio data and/or metadata from the slave unit to the master unit with fourth highest priority.

In a further embodiment of the method the master unit and the slave unit can each be in one of the following states:

"initialise/sleep" state, wherein neither the master unit nor the slave unit drive the bus line and the bus line is maintained in a "pull-down" state;

"unsynchronised" state, wherein the master unit sends frames consisting of a continuous stream of identical bits and a clock reference comprising at least one bit transition;

"frame synchronised" state, wherein the slave unit transmits signalling bits to the master unit during the slave signalling interval indicating to the master unit that the slave unit is synchronised to the frame, e.g. by means of a "slave alive" signalling bit.

In a further embodiment the method further comprises the step of the slave unit waking up the master unit from the "sleep" state by sending a wake-up pulse pattern of configurable duration, such as a continuous stream of "1"s, for instance lasting longer than a wake-up detection period of the master unit.

In a further embodiment the method further comprises the step of the master unit sending a continuous stream of "1"s for a duration of at least a frame interval (without inserting a clock reference) and the slave unit is reset thereupon. Alternatively, any other high priority signal besides a reset can be signalled in this way. This feature is available in any of the mentioned protocol states.

In a further embodiment the method further comprises the step of scrambling or whitening of data.

The present invention further provides a use of the proposed methods in a hearing device, wherein the frequency of the first local bit clock and/or the frequency of the second local bit clock is related to a sampling frequency of an audio signal from which audio data is derived.

The present invention further provides another use of the proposed methods to transfer data between a master unit which is part of an integrated circuit of a hearing device and a slave unit which is part of an accessory physically attached to the hearing device, such as a plug-on device, in particular of a "digital audio shoe".

It is pointed out that further combinations of the above-mentioned embodiments may be employed to realise further, more specific configurations according to the present invention.

BRIEF DESCRIPTION OF THE DRAWINGS

The present invention is further explained below by means of non-limiting specific embodiments and with reference to the accompanying drawings. What is shown in the figures is the following.

DETAILED DESCRIPTION OF THE INVENTION

Figure 1A:
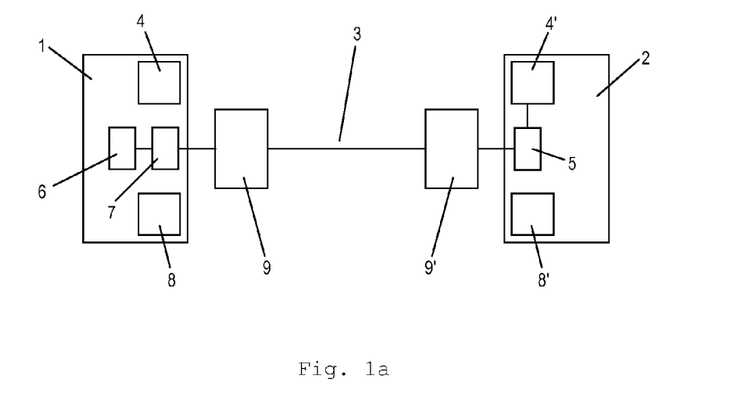
FIG. 1(a) schematically depicts a data transmission system according to the present invention employing a single serial bus line.

A block diagram of a data transmission system according to the present invention is shown in FIG. 1a. The data transmission system comprises a master unit 1 and a slave unit 2 which communicate with one another over a single bus line 3 thus providing a point-to-point connection. The roles of master and slave are assigned a priori and remain fixed, both for reasons of simplicity. The master unit 1 and the slave unit 2 each have their own local bit clock 4 and 4' which are operating independently from each other. Communication between the master unit 1 and the slave unit 2 is performed according to a communication protocol based on a frame-wise serial transmission of bits.

Figure 2A:
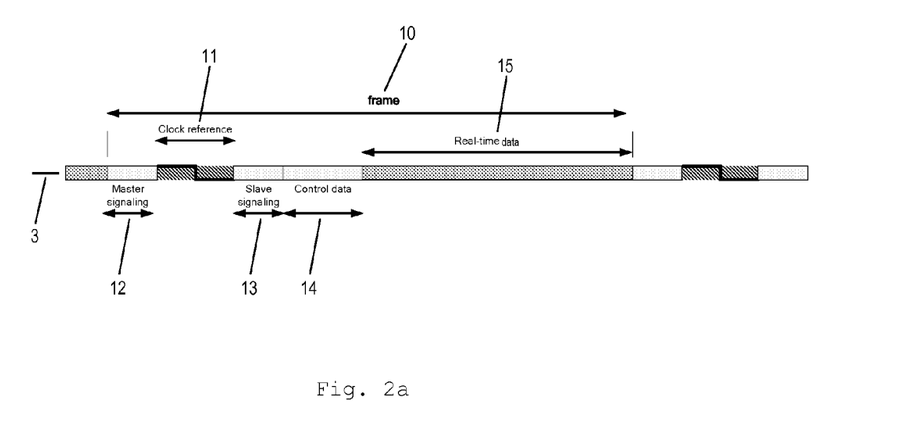
FIG. 2(a) schematically depicts a frame structure according to the present invention for the case when a single serial bus line is employed.

A frame 10 is a repetitive data unit of which an exemplary structure is illustrated in FIG. 2a. The frame 10 consists of a master signalling interval 12 followed by a clock reference 11 followed by a slave signalling interval 13 followed by a data payload 14, 15. Preceding the clock reference 11, a number of master signalling bits are sent by the master unit 1 to the slave unit 2 for instance for bus arbitration of the data payload 14, 15 (and possibly for multi-framing purposes). The master unit 1 then provides a periodic clock reference 11, which is derived from its local bit clock 4, to the slave unit 2, based upon which the slave unit 2 adjusts the frequency and phase of its local bit clock 4'. In order to achieve precise synchronisation of the local bit clock 4' of the slave unit 2 with the local bit clock 4 of the master unit 1 the edges of the clock reference 11 need to be particularly steep, i.e. sharp bit transitions are required for the clock reference 11. The master unit 1 achieves this by applying a drive means 6 to boost the clock reference 11 compared to the other bits being transferred. Employing less sharp transitions for the other bits both saves power and reduces the amount of interference produced due to signal edges, thus minimising disturbance for the surrounding electronics due to EMI. After the clock reference 11 transmission is handed over to the slave unit 2 which sends a number of slave signalling bits to the master unit 1 again for instance for bus arbitration of the data payload 14, 15 (and possibly for multi-framing purposes). The first slave signalling bit is the "slave alive" bit with which the slave unit 2 signals to the master unit 1 that the slave unit 2 is synchronised to the frame 10, i.e. that it has successfully detected the edge of the clock reference 11 and the boundary of the frame 10. Due to the importance of this information the "slave alive" bit requires careful attention, since the master unit 1 needs to be able to reliably detect the "slave alive" bit. If the slave unit 2 is synchronised with the frame 10, it actively drives the "slave alive" bit "high" (i.e. to a logic "1" state). Before the "slave alive" bit interval the master unit 1 activates a bus keeper 7, in order to ensure that the bus line 3 clearly conveys a logic "0" at the end of the clock reference 11, and thus serving as a pull-down in order to define the bus line state in case the slave unit 2 does not set the "slave alive" bit. The bus keeper 7 remains active at least until the end of the "slave alive" bit interval. If the slave unit 2 signals "slave alive", the master unit 1 can turn off the bus keeper 7 after the "slave alive" bit interval. If the slave unit 2 does not signal "slave alive", then the master unit 1 keeps the bus keeper 7 active until the end of the slave signalling interval 13. The data payload following the slave signalling interval 13 consists of a block of control data 14 and/or real-time data 15 bits and is transmitted by either the master unit 1 or the slave unit 2 dependent on the outcome of the bus arbitration process described below. Real-time data 14 refers to data having a constant guaranteed throughput and guaranteed constant delay, such as for instance required in hearing devices for the transmission of audio data and metadata related to (e.g. descriptive of) the audio data.

What kind of data is sent in the data payload 14, 15 of a frame 10 and by whom, i.e. either by the master unit 1 or by the slave unit 2, is negotiated between the master unit 1 and the slave unit 2 by means of the master signalling bits and the slave signalling bits during the master signalling interval 12 and the slave signalling interval 13 immediately preceding the data payload 14, 15. This process is referred to as bus arbitration. The fact that this process is only based on the master signalling bits and the slave signalling bits being sent in and only applicable to the on-going frame 10 restricts the complexity of bus arbitration and thus provides a simple solution which can be implemented with less logic and memory in a small, power-efficient circuit.

Figure 3:
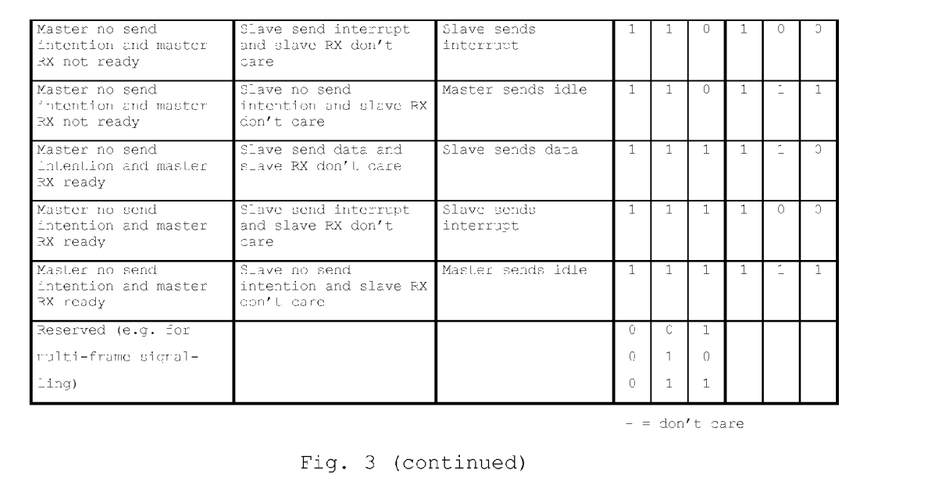
FIG. 3 presents an exemplary table of an arbitration scheme for the data payload of a frame based on master signalling bits and slave signalling bits.

An exemplary master signalling scheme and slave signalling scheme, respectively, is shown in the fourth and fifth column, respectively, of the table of FIG. 3. The data payload can comprise both control data 14 and real-time data 15. The control data 14 can be dynamically allocated to different kinds of data having different priorities. For example the control data 14 can be one of interrupt vector data sent from the master unit 1 to the slave unit 2 having highest priority #1, interrupt vector data sent from the slave unit 2 to the master unit 1 having second highest priority #2, other data sent from the master unit 1 to the slave unit 2 having second lowest priority #3, or other data sent from the slave unit 2 to the master unit 1 having lowest priority #4. The proposed solution thus allows data payloads to be sent in both directions using half-duplex transmission. Furthermore, it provides an interrupt capability having guaranteed low latency because interrupts can be requested on a frame by frame basis. The way in which the real-time data 15 is allocated can for instance be negotiated by higher level instances (e.g. a higher layer protocol) based on the "other" kind of control data (having priority #3 and #4). If no transmission request is pending, the master unit 1 sends an "idle" data payload. The "idle" data payload consists of all "1"s and actively driven by the master unit 1. The arbitration mechanism can for example operate as follows:
1. The master unit 1 signals according to its send request and its data receive status;
2. The slave unit 2 evaluates the master's signalling and determines the arbitration decision based on the master and slave requests and the underlying priority scheme, yielding one of:
    a) master send request is granted if the slave request has lower priority and the slave unit 2 is ready to receive data;
    b) slave send request is granted if the master unit 1 is ready to receive data and the slave unit 2 has data to be sent (i.e. issues a send request);
    c) no request is granted if no request is pending or if the dedicated unit is not ready to receive data;
3. The slave unit 2 signals according to the arbitration decision;
4. The master unit 1 evaluates the slave's signalling to determine the bus arbitration decision.

An exemplary bus arbitration scheme is shown in the table of FIG. 3 using the master and slave signalling schemes mentioned above.

Both the master unit 1 and the slave unit 2 can indicate that they are not ready to receive the data payload 14, 15 for instance when the data payload 14, 15 from a previous frame is still being processed and the buffers cannot yet accommodate a new data payload 14, 15. In this way a flow control mechanism is put in place that ensures that no data will be lost by overwriting unprocessed data with new data in situations where the communication buffers are being filled more rapidly than the receiving unit is able to fetch and process the received data due to memory size and processing speed limitations.

Special attention is given to the selection of the master and slave signalling bits, whose selection is based on employing bit sequences exhibiting a minimal number of bit transitions. This results in reduced power consumption and lower EMI. To further reduce the power consumption caused by switching activity on the bus line 3, the protocol is designed such that no signal transitions are generated if the data payload is empty. Moreover, a special data encoding can be applied to the data payload in order to achieve a reduced number of bit transitions in the data payload, as for instance disclosed in "Approximate arithmetic coding for bus transition reduction in low power designs" by H. Lekatsas et al. (IEEE Trans. on VLSI Systems, Vol. 13, Issue 6, June 2005, pp. 696-707).

Figure 1B:
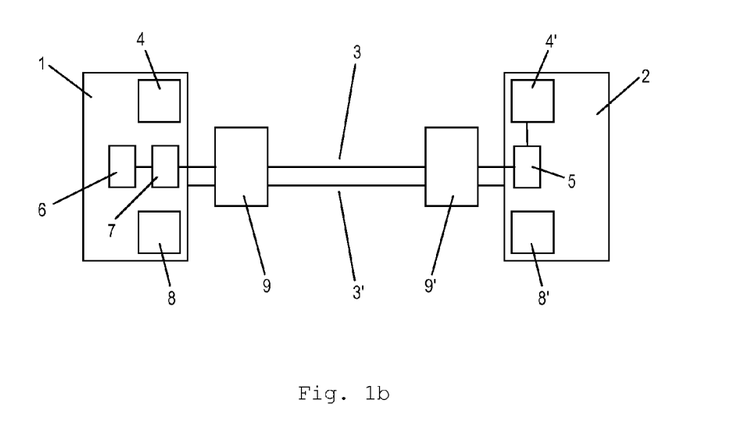
FIG. 1(b) schematically depicts a data transmission system according to the present invention further employing a second serial bus line.
Figure 2B:
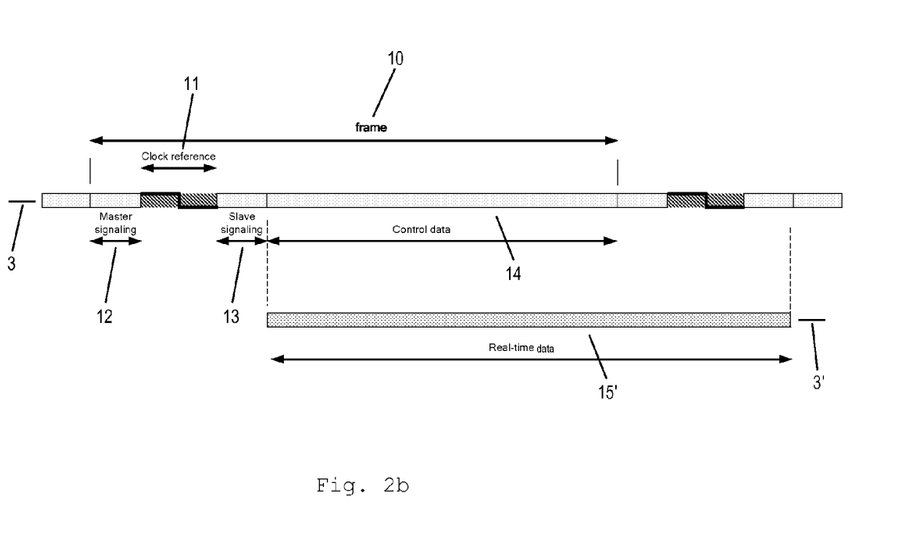
FIG. 2(b) schematically depicts a frame structure according to the present invention for the case when two serial bus lines are employed.

The proposed data transmission system can be extended by adding one (i.e. a second) or more additional serial bus lines 3' as schematically shown in FIG. 1b. As is apparent from FIG. 2b only real-time data 15' is transferred over the second serial bus line 3', whereby the timing information is taken from the clock reference 11 sent on the first bus line 3. The multiplex of the real-time data frame, i.e. which unit (master or slave) is sending data for how long within a real-time frame or over multiple frames (i.e. multi-frame transmission), is configured by a higher layer protocol. The capacity of the proposed data transmission system can thus be adapted to the requirements of a specific application by simply increasing the number of serial bus lines 3' employed to transfer real-time data 15' concurrently. Alternatively, the data rate and thus the capacity can be raised by increasing the rate of the local bit clocks 4, 4', thus allowing to implement different transmission rate profiles using a certain number of one or more bus lines 3, 3'.

The master unit 1 and the slave unit 2 each further comprise a protocol state machine 8, 8'. In order to minimize circuit complexity and size as well as power consumption of these protocol state machines 8, 8' a simple protocol based on a small number of protocol states is employed. The master unit 1 and slave unit 2 can reside in a "sleep" state which is an ultra-low power mode characterised in that the only activity of the master unit 1 and the slave unit 2 is to detect wake-up triggers and the bus line 3 (and any further bus lines 3') is in a "pull-down" state (i.e. is connected to ground through a high-ohm resistor, e.g. with a value of 50 $k\Omega$ to 100 $k\Omega$, referred to as a pull-down resistor). When the master unit 1 and the slave unit 2 are in the "sleep" state, the master unit 1 can be woken up by a higher level instance (e.g. through a request from a higher layer protocol) whereupon it enters the "unsynchronised" state in order to wake up the slave unit 2 from its "sleep"/"initialise" state. The master unit 1 then checks that the bus line 3 is free (i.e. that the slave unit 2 is not sending a wake-up pulse) and starts to send an idle frame, i.e. a frame consisting of continuous stream of "1"s and a clock reference 11 followed by a timespan, corresponding to the slave signalling interval 13, during which the master unit 1 applies a pull-down resistor to the bus line 3. The slave unit 2 wakes up upon detecting slopes of the clock reference 11. Conversely, starting from the "sleep"/"initialise" state the slave unit 2 can wake up the master unit 1 by transmitting a long "1"/"high" pulse, e.g. with a duration of half a frame interval, after having checked that the bus line 3 is free (i.e. that the master unit 1 is not sending an idle frame). This wake-up pulse is detected by the master unit 1 during its "sleep" state and causes the transition to the "initialise" state, wherein it starts sending idle frames after a waiting period of at least the duration of the wake-up pulse of the slave unit 2, in order to let the wake-up pulse from the slave unit 2 to finish before starting to send the idle frame. After sending the wake-up pulse the slave unit 2 changes to the "unsynchronised" state until it detects a negative slope of the clock reference 11 sent by the master unit 1 with the idle frame, whereupon the slave unit 2 enters the "frame synchronised" state and sets the "slave alive" bit, i.e. the first slave signalling bit to be transmitted to the master unit 1 during the slave signalling interval 13. Following reception by the master unit 1 of the set "slave alive" bit from the slave unit 2, the master unit also changes to the "frame synchronised" state and starts sending the master signalling bits during the master signalling interval 12 before the next clock reference 11, whereupon regular frames 10 (as shown in FIG. 2a) are used for communication and data exchange commences.

Subsequently, the master unit 1 can actively initialise the slave unit 2 by not sending a clock reference 11 for a certain period of time (e.g. at least for a duration of two frame intervals). On the other hand the slave unit 2 can actively initialise the master unit 1 by not setting the "slave alive" bit for a certain period of time (e.g. at least for a duration of two frame intervals).

It is further proposed to implement a reset mechanism orthogonal to (i.e. overlaid and independent of) the main communication protocol described above. This is achieved by setting the logical levels on the bus line 3 into states which contradict to the valid bus states as prescribed by the main protocol and detecting such protocol violations. Such a low-level signalling can be implemented in both directions to realise a peer-to-peer reset. This additionally saves up to two reset lines between the master unit 1 and the slave unit 2, thus conserving space. For this purpose a first and a second reset unit 9 and 9', respectively, are inserted between the master unit 1 and slave unit 2, respectively, and the bus line 3, whereby the first reset unit 9 forwards the signal intended to be transmitted over the bus line 3 from the master unit 1 and monitors the signal on the bus line 3 and passes it on to the master unit 1. This correspondingly applies to the second reset unit 9' associated with the slave unit 2. In order to reset the slave unit 2, the first reset unit 9 associated with the master unit 1 stops forwarding the signal from the master unit 1 intended to be transmitted over the bus line 3 and instead sends a continuous stream of "1"s for a duration of a frame. The second reset unit 9' associated with the slave unit 2 detects this continuous stream of "1"s, which is a transmission sequence that is not encountered during the transmission based on the main communication protocol, and thus identifies this as a reset signal from the master unit 1. The proposed data transmission system thus provides a reset mechanism which operates alongside and independently of the communication protocol.

In summary the proposed data transmission system and the corresponding method for data transmission offer the following features:

- Point-to-point connection of two peers, one in a master role and the other in a slave role. The role of a peer is a-priori known (i.e. is not negotiated by the protocol in order to simplify the implementation).
- Transmission on one wire of a clock reference and an asynchronous bi-directional half-duplex control channel and (optionally) a constant bit rate constant delay data channel, e.g. for audio and/or metadata.
- Dynamic allocation of the capacity of the data channels in the two directions by priority.
- Scalability through one or more additional wires for (further) real-time constant bit rate, constant delay data channels. Data transmission is possible in either direction. The clock reference defines the bit clock frequency and phase, which is typically related to the audio sampling frequency of the audio data.
- Interrupt capability for master and slave with low, guaranteed latency. An entire interrupt vector can be sent at once as a "push notification" instead of employing a traditional polling mechanism.
- Wake-up mechanism such that the master can wake up the slave and the slave can wake up the master.
- Interface initialisation capability such that the master can (re-)initialise the slave and the slave can (re-) initialise the master.
- Reset mechanism over the same wire as the main communication protocol but independent thereof.

The proposed data transmission system and the corresponding method for data transmission thus provide the following benefits and advantages over known bus systems for use in hearing devices:

- Minimal number of interconnects between components (e.g. integrated circuits constituting a hearing device).
- Flexible and scalable bandwidth/capacity allocation between different data traffic types and transmission directions.
- Event communication with predictable real-time properties (e.g. to emulate an interrupt line).
- Low-complexity implementation in a digital circuit.
- Built-in flow control to support devices with limited resources (e.g. limited memory for communication buffers and a slow CPU for reduced power consumption).

Optimised for ultra-low power consumption (e.g. power is consumed only when data needs to be communicated; minimisation of signal transitions; restricted use of sharp transitions to edge of clock reference).

Low electro-magnetic interference (EMI) caused by the communication infrastructure (i.e. the bus system) for the other system components.

What is claimed is:

1. A data transmission system for use in hearing devices, the data transmission system comprising a master unit (1) with a first local bit clock (4) and a slave unit (2) with a second local bit clock (4'), the master unit (1) and the slave unit (2) being connected to each other via a bus line (3), and being configured to communicate over the bus line (3) according to a communication protocol based on a frame-wise serial transmission of bits, each frame (10) comprising a clock reference (11), a master signalling interval (12), a slave signalling interval (13) and a data payload (14, 15), wherein the slave unit (2) further comprises clock recovery means (5) for synchronising the second local bit clock (4') with the first local bit clock (4) based on the clock reference (11) transmitted once per frame (10) by the master unit (1),
wherein slave signalling bits are transmitted from the slave unit (2) to the master unit (1) during the slave signalling interval (13), the slave signalling bits comprising information pertaining to at least one of the following in respect of the frame (10) within which the slave signalling bits are transmitted:
an indication that the slave unit (2) is synchronised to the frame (10);
an indication that the slave unit (2) does not intend to send a data payload (14, 15) to the master unit (1);
an indication that the slave unit (2) will send a data payload (14, 15) to the master unit (1);
an indication that the slave unit (2) is ready to receive a data payload (14, 15) from the master unit (1);
an indication that the slave unit (2) is not ready to receive a data payload (14, 15) from master unit (1);
an indication that the slave unit (2) will send interrupt vector data to the master unit (1).

2. The data transmission system of claim 1, wherein the data payload (14, 15) comprises at least one of the following:
control data (14);
audio data (15);
metadata (15).

3. The data transmission system of claim 2, wherein the data are scrambled or whitened.

4. The data transmission system of claim 1, wherein the master unit (1) and the slave unit (2) are further connected to each other via one or more further bus lines (3'), and are configured to transfer further data payloads (15') comprising audio data and/or metadata over the one or more further bus lines (3') using frame-wise serial transmission of bits.

5. The data transmission system of claim 4, wherein the transfer of the further data payloads (15') over the one or more further bus lines (3') is configurable to be:
from the master unit (1) to the slave unit (2), or
from the slave unit (2) to the master unit (1), or
partly from the master unit (1) to the slave unit (2) and partly from the slave unit (2) to the master unit (1),
dependent on information from the data payload (14, 15) transferred over the bus line (3).

6. The data transmission system of claim 1, wherein the master unit (1) further comprises drive means (6) for driving the bus line (3) such that edges of the clock reference (11) are steeper than edges of bit transitions within the master signalling interval (12), the slave signalling interval (13) and the data payload (14, 15).

7. The data transmission system of claim 1, wherein the slave signalling bits are dependent on the master signalling bits transmitted within only the same frame (10).

8. The data transmission system of claim 1, wherein a first slave signalling bit provides an indication that the slave unit (2) is synchronised to the frame (10).

9. The data transmission system of claim 1, wherein the slave unit (2) is configured to send the first slave signalling bit immediately following reception of the clock reference (11).

10. The data transmission system of claim 1, wherein the master unit (1) further comprises a bus keeper (7) and is configured to activate the bus keeper (7) at least immediately following transmission of the clock reference (11), preferably for no longer than a bit interval.

11. The data transmission system of claim 1, further comprising a first reset unit (9), which is inserted between the master unit (1) and the bus line (3), and a second reset unit (9'), which is inserted between the slave unit (2) and the bus line (3), wherein the first reset unit (9) is configured to send a reset signal, such as a continuous stream of "1"s for a duration of at least a frame interval, and the second reset unit (9') is configured to reset the slave unit upon detecting the reset signal.

12. A hearing device comprising the data transmission system of claim 1, wherein the frequency of the first local bit clock (4) and/or the frequency of the second local bit clock (4') is related to a sampling frequency of an audio signal from which audio data (15) is derived.

13. A hearing device comprising the data transmission system of claim 1, wherein the master unit (1) is part of an integrated circuit of the hearing device and the slave unit (2) is part of a further integrated circuit of the hearing device or part of an accessory physically attached to the hearing device, in particular part of a "digital audio shoe".

14. A data transmission system for use in hearing devices, the data transmission system comprising a master unit (1) with a first local bit clock (4) and a slave unit (2) with a second local bit clock (4'), the master unit (1) and the slave unit (2) being connected to each other via a bus line (3), and being configured to communicate over the bus line (3) according to a communication protocol based on a frame-wise serial transmission of bits, each frame (10) comprising a clock reference (11), a master signalling interval (12), a slave signalling interval (13) and a data payload (14, 15), wherein the slave unit (2) further comprises clock recovery means (5) for synchronising the second local bit clock (4') with the first local bit clock (4) based on the clock reference (11) transmitted once per frame (10) by the master unit (1),
wherein master signalling bits are transmitted from the master unit (1) to the slave unit (2) during the master signalling interval (12), the master signalling bits comprising information pertaining to at least one of the following in respect of the frame (10) within which the master signalling bits are transmitted:
a request of the master unit (1) to send a data payload (14, 15) to the slave unit (2);
an indication that the master unit (1) will not send a data payload (14, 15) to the slave unit (2);
an indication that the master unit (1) is ready to receive a data payload (14, 15) from the slave unit (2);
an indication that the master unit (1) is not ready to receive a data payload (14, 15) from the slave unit (2);

an indication that the master unit (1) will send interrupt vector data to the slave unit (2).

15. A data transmission system for use in hearing devices, the data transmission system comprising a master unit (1) with a first local bit clock (4) and a slave unit (2) with a second local bit clock (4'), the master unit (1) and the slave unit (2) being connected to each other via a bus line (3), and being configured to communicate over the bus line (3) according to a communication protocol based on a framewise serial transmission of bits, each frame (10) comprising a clock reference (11), a master signalling interval (12), a slave signalling interval (13) and a data payload (14, 15), wherein the slave unit (2) further comprises clock recovery means (5) for synchronising the second local bit clock (4') with the first local bit clock (4) based on the clock reference (11) transmitted once per frame (10) by the master unit (1),
  wherein at least part of the data payload (14, 15) is dynamically assignable dependent on the information exchanged between the master unit (1) and the slave unit (2) in the master signalling interval (12) and the slave signalling interval (13) and according to the following priority scheme:
  interrupt vector data from the master unit (1) to the slave unit (2) with highest priority;
  interrupt vector data from the slave unit (2) to the master unit (1) with second highest priority;
  control data (14) and/or audio data (15) and/or metadata (15) from the master unit (1) to the slave unit (2) with third highest priority;
  control data (14) and/or audio data (15) and/or metadata (15) from the slave unit (2) to the master unit (1) with fourth highest priority.

16. A data transmission system for use in hearing devices, the data transmission system comprising a master unit (1) with a first local bit clock (4) and a slave unit (2) with a second local bit clock (4'), the master unit (1) and the slave unit (2) being connected to each other via a bus line (3), and being configured to communicate over the bus line (3) according to a communication protocol based on a framewise serial transmission of bits, each frame (10) comprising a clock reference (11), a master signalling interval (12), a slave signalling interval (13) and a data payload (14, 15), wherein the slave unit (2) further comprises clock recovery means (5) for synchronising the second local bit clock (4') with the first local bit clock (4) based on the clock reference (11) transmitted once per frame (10) by the master unit (1),
  wherein the master unit (1) and the slave unit (2) each further comprise a protocol state machine (8, 8'), the protocol state machine (8, 8') being capable of supporting the following protocol states:
  "initialise"/"sleep" state, wherein neither the master unit (1) nor the slave unit (2) drive the bus line (3) and the bus line (3) is maintained in a "pull-down" state;
  "unsynchronised" state, wherein the master unit (1) sends frames (10) consisting of a continuous stream of identical bits and a clock reference (11) comprising at least one bit transition;
  "frame synchronised" state, wherein the slave unit (2) transmits signalling bits to the master unit (1) during the slave signalling interval (13) indicating to the master unit (1) that the slave unit (2) is synchronised to the frame (10).

17. The data transmission system of claim 16, wherein the slave unit (2) is configured to wake up the master unit (1) from the "sleep" state by sending a wake-up pulse pattern of configurable duration, such as a continuous stream of "1"s, for instance lasting longer than a wake-up detection period of the master unit (1).

18. A method for data transmission between a master unit (1) with a first local bit clock (4) and a slave unit (2) with a second local bit clock (4') via a bus line (3) connecting the master unit (1) and the slave unit (2) to each other, wherein bits are serially transmitted using a frame structure, the method comprising the steps of:
  transmitting master signalling bits from the master unit (1) to the slave unit (2) during a master signalling interval (12) in each frame (10);
  transmitting a clock reference (11) from the master unit (1) to the slave unit (2) once per frame (10);
  synchronising the second local bit clock (4') with the first local bit clock (4) based on the clock reference (11);
  transmitting slave signalling bits from the slave unit (2) to the master unit (1) during a slave signalling interval (12) in each frame (10);
  transmitting a data payload (14, 15) either from the master unit (1) to the slave unit (2) or from the slave unit (2) to the master unit (1) in each frame (10); and
  transmitting slave signalling bits from the slave unit (2) to the master unit (1) during the slave signalling interval (13), the slave signalling bits comprising information pertaining to at least one of the following in respect of the frame (10) within which the slave signalling bits are transmitted:
  an indication that the slave unit (2) is synchronised to the frame (10);
  an indication that the slave unit (2) does not intend to send a data payload (14, 15) to the master unit (1);
  an indication that the slave unit (2) will send a data payload (14, 15) to the master unit (1);
  an indication that the slave unit (2) is ready to receive a data payload (14, 15) from the master unit (2);
  an indication that the slave unit (2) is not ready to receive a data payload (14, 15) from master unit (1);
  an indication that the slave unit (2) will send interrupt vector data to the master unit (1).

19. The method of claim 18, wherein the data payload (14, 15) comprises at least one of the following:
  control data (14);
  audio data (15);
  metadata (15).

20. The method of claim 19, further comprising the step of scrambling or whitening of data.

21. The method of claim 18, wherein the master unit (1) and the slave unit (2) are further connected to each other via one or more further bus lines (3'), the method further comprising the step of serially transmitting bits of further data payloads (15') with audio data and/or metadata over the one or more further bus lines (3') using frame-wise serial transmission of bits.

22. The method of claim 21, wherein the transfer of the further data payloads (15') over the one or more further bus lines (3') is configured to be:
  from the master unit (1) to the slave unit (2), or
  from the slave unit (2) to the master unit (1), or
  partly from the master unit (1) to the slave unit (2) and partly from the slave unit (2) to the master unit (1), dependent on information from the data payload (14, 15) transferred over the bus line (3).

23. The method of claim 18, wherein the master unit (1) drives the bus line (3) such that edges of the clock reference (11) are steeper than edges of bit transitions within the master signalling interval (12), the slave signalling interval (13) and the data payload (14, 15).

24. The method of claim 18, wherein the slave signalling bits are dependent on the master signalling bits transmitted within only the same frame (10).

25. The method of claim 18, wherein a first slave signalling bit provides an indication that the slave unit (2) is synchronised to the frame (10).

26. The method of claim 18, wherein the slave unit (2) sends the first slave signalling bit immediately following reception of the clock reference (11).

27. The method of claim 18, wherein the master unit (1) activates a bus keeper (7) at least immediately following transmission of the clock reference (11), preferably for no longer than a bit interval.

28. The method of claim 18, further comprising the step of the master unit (1) sending a continuous stream of "1"s for a duration of at least a frame interval and the slave unit (2) is reset thereupon.

29. A use of the method of claim 18 in a hearing device, wherein the frequency of the first local bit clock (4) and/or the frequency of the second local bit clock (4') is related to a sampling frequency of an audio signal from which audio data (15) is derived.

30. A use of the method of claim 18 to transfer data between the master unit (1) which is part of an integrated circuit of a hearing device and the slave unit (2) which is part of an accessory physically attached to the hearing device, in particular part of a "digital audio shoe".

31. A method for data transmission between a master unit (1) with a first local bit clock (4) and a slave unit (2) with a second local bit clock (4') via a bus line (3) connecting the master unit (1) and the slave unit (2) to each other, wherein bits are serially transmitted using a frame structure, the method comprising the steps of:
- transmitting master signalling bits from the master unit (1) to the slave unit (2) during a master signalling interval (12) in each frame (10);
- transmitting a clock reference (11) from the master unit (1) to the slave unit (2) once per frame (10);
- synchronising the second local bit clock (4') with the first local bit clock (4) based on the clock reference (11);
- transmitting slave signalling bits from the slave unit (2) to the master unit (1) during a slave signalling interval (12) in each frame (10);
- transmitting a data payload (14, 15) either from the master unit (1) to the slave unit (2) or from the slave unit (2) to the master unit (1) in each frame (10); and
- transmitting master signalling bits from the master unit (1) to the slave unit (2) during the master signalling interval (12), the master signalling bits comprising information pertaining to at least one of the following in respect of the frame (10) within which the master signalling bits are transmitted:
  - a request of the master unit (1) to send a data payload (14, 15) to the slave unit (2);
  - an indication that the master unit (1) will not send a data payload (14, 15) to the slave unit (2);
  - an indication that the master unit (1) is ready to receive a data payload (14, 15) from the slave unit (2);
  - an indication that the master unit (1) is not ready to receive a data payload (14, 15) from the slave unit (2);
  - an indication that the master unit (1) will send interrupt vector data to the slave unit (2).

32. A method for data transmission between a master unit (1) with a first local bit clock (4) and a slave unit (2) with a second local bit clock (4') via a bus line (3) connecting the master unit (1) and the slave unit (2) to each other, wherein bits are serially transmitted using a frame structure, the method comprising the steps of:
- transmitting master signalling bits from the master unit (1) to the slave unit (2) during a master signalling interval (12) in each frame (10);
- transmitting a clock reference (11) from the master unit (1) to the slave unit (2) once per frame (10);
- synchronising the second local bit clock (4') with the first local bit clock (4) based on the clock reference (11);
- transmitting slave signalling bits from the slave unit (2) to the master unit (1) during a slave signalling interval (12) in each frame (10);
- transmitting a data payload (14, 15) either from the master unit (1) to the slave unit (2) or from the slave unit (2) to the master unit (1) in each frame (10); and
- dynamically assigning at least part of the data payload (14, 15) dependent on the information exchanged between the master unit (1) and the slave unit (2) during the master signalling interval (12) and the slave signalling interval (13) and according to the following priority scheme:
  - interrupt vector data from the master unit (1) to the slave unit (2) with highest priority;
  - interrupt vector data from the slave unit (2) to the master unit (1) with second highest priority;
  - control data (14) and/or audio data (15) and/or metadata (15) from the master unit (1) to the slave unit (2) with third highest priority;
  - control data (14) and/or audio data (15) and/or metadata (15) from the slave unit (2) to the master unit (1) with fourth highest priority.

33. A method for data transmission between a master unit (1) with a first local bit clock (4) and a slave unit (2) with a second local bit clock (4') via a bus line (3) connecting the master unit (1) and the slave unit (2) to each other, wherein bits are serially transmitted using a frame structure, the method comprising the steps of:
- transmitting master signalling bits from the master unit (1) to the slave unit (2) during a master signalling interval (12) in each frame (10);
- transmitting a clock reference (11) from the master unit (1) to the slave unit (2) once per frame (10);
- synchronising the second local bit clock (4') with the first local bit clock (4) based on the clock reference (11);
- transmitting slave signalling bits from the slave unit (2) to the master unit (1) during a slave signalling interval (12) in each frame (10);
- transmitting a data payload (14, 15) either from the master unit (1) to the slave unit (2) or from the slave unit (2) to the master unit (1) in each frame (10), wherein the master unit (1) and the slave unit (2) can each be in one of the following states:
- "initialise"/"sleep" state, wherein neither the master unit (1) nor the slave unit (2) drive the bus line (3) and the bus line (3) is maintained in a "pull-down" state;
- "unsynchronised" state, wherein the master unit (1) sends frames (10) consisting of a continuous stream of identical bits and a clock reference (11) comprising at least one bit transition;
- "frame synchronised" state, wherein the slave unit (2) transmits signalling bits to the master unit (1) during the slave signalling interval (13) indicating to the master unit (1) that the slave unit (2) is synchronised to the frame (10).

34. The method of claim 33, further comprising the step of the slave unit (2) waking up the master unit (1) from the "sleep" state by sending a wake-up pulse pattern of configurable duration, such as a continuous stream of "1"s, for instance lasting longer than a wake-up detection period of the master unit (1).

* * * * *